(12) United States Patent
Patten et al.

(10) Patent No.: US 11,226,221 B2
(45) Date of Patent: Jan. 18, 2022

(54) APPARATUS FOR APPLYING A VARIABLE ZERO ALGORITHM IN A VIBRATING FLOWMETER AND RELATED METHOD

(71) Applicant: Micro Motion, Inc., Boulder, CO (US)

(72) Inventors: Andrew Timothy Patten, Boulder, CO (US); Anthony William Pankratz, Arvada, CO (US); Dean M Standiford, Loveland, CO (US); Aart R Pruysen, Ede (NL)

(73) Assignee: Micro Motion, Inc., Boulder, CO (US)

( * ) Notice: Subject to any disclaimer, the term of this patent is extended or adjusted under 35 U.S.C. 154(b) by 366 days.

(21) Appl. No.: 15/513,500

(22) PCT Filed: Sep. 10, 2015

(86) PCT No.: PCT/US2015/049312
§ 371 (c)(1),
(2) Date: Mar. 22, 2017

(87) PCT Pub. No.: WO2016/064488
PCT Pub. Date: Apr. 28, 2016

(65) Prior Publication Data
US 2017/0254688 A1  Sep. 7, 2017

Related U.S. Application Data

(60) Provisional application No. 62/066,679, filed on Oct. 21, 2014.

(51) Int. Cl.
*G01F 1/84* (2006.01)
*G01F 25/00* (2006.01)
(Continued)

(52) U.S. Cl.
CPC .......... *G01F 1/8436* (2013.01); *G01F 15/028* (2013.01); *G01F 25/0007* (2013.01);
(Continued)

(58) Field of Classification Search
None
See application file for complete search history.

(56) References Cited

U.S. PATENT DOCUMENTS 4,109,524 A   8/1978   Smith
RE31,450 E   11/1983   Smith
(Continued)

FOREIGN PATENT DOCUMENTS

JP     2008102155 A       5/2008
JP     2015072284 A   *   4/2015
(Continued)

OTHER PUBLICATIONS

Machine Translation for JP2015072284A (Year: 2015).*

*Primary Examiner* — Catherine T. Rastovski
*Assistant Examiner* — Leonard S Liang
(74) *Attorney, Agent, or Firm* — The Ollila Law Group LLC (57) ABSTRACT

A method for operating a flowmeter is provided. The method includes the steps of measuring a fluid flow in the flowmeter, determining at least one fluid characteristic, determining a preferred algorithm of a plurality of algorithms based upon the fluid flow and the at least one fluid characteristic, and applying the preferred algorithm to an operating routine.

25 Claims, 4 Drawing Sheets

(51) Int. Cl.
*G01F 15/02* (2006.01)
*G01G 11/00* (2006.01)
*G01F 1/76* (2006.01)
*G01F 1/00* (2006.01)
*G01F 1/74* (2006.01)

(52) U.S. Cl.
CPC .................. *G01F 1/00* (2013.01); *G01F 1/74* (2013.01); *G01F 1/76* (2013.01); *G01F 1/8413* (2013.01); *G01F 1/8477* (2013.01); *G01F 15/02* (2013.01); *G01F 15/024* (2013.01); *G01G 11/00* (2013.01)

(56) References Cited

U.S. PATENT DOCUMENTS

| | | | |
|---|---|---|---|
| 4,491,025 A | 1/1985 | Smith et al. | |
| 5,907,104 A | 5/1999 | Cage et al. | |
| 6,327,915 B1* | 12/2001 | Van Cleve | G01F 1/8409 73/861.357 |
| 6,352,001 B1* | 3/2002 | Wickert | G01F 1/44 73/861.52 |
| 6,360,579 B1* | 3/2002 | De Boom | G01F 25/003 73/1.35 |
| 6,404,344 B1* | 6/2002 | Young | G01F 1/663 340/600 |
| 6,502,466 B1* | 1/2003 | Cage | G01F 1/8436 73/861.355 |
| 6,505,519 B2 | 1/2003 | Henry et al. | |
| 6,556,931 B1 | 4/2003 | Hays et al. | |
| 6,758,102 B2 | 7/2004 | Henry et al. | |
| 6,981,424 B2 | 1/2006 | Henry et al. | |
| 6,997,032 B2* | 2/2006 | Mattar | G01F 1/74 73/1.16 |
| 7,194,368 B2* | 3/2007 | Stack | G01F 1/8477 702/100 |
| 7,480,577 B1* | 1/2009 | Feller | G01F 1/00 702/100 |
| 7,726,203 B2 | 6/2010 | Mattar et al. | |
| 7,845,242 B2* | 12/2010 | McAnally | G01F 1/8413 73/861.355 |
| 7,904,268 B2* | 3/2011 | Wheeler | G01F 1/8413 702/100 |
| 8,239,157 B2 | 8/2012 | Mcanally et al. | |
| 9,400,203 B2* | 7/2016 | Patten | G01F 1/8436 |
| 9,711,038 B1* | 7/2017 | Pennebaker, III | G08C 17/02 |
| 10,502,604 B2* | 12/2019 | Zimmer | G01F 9/001 |
| 2001/0045134 A1* | 11/2001 | Henry | G01F 1/74 73/861.356 |
| 2002/0157448 A1* | 10/2002 | Hirai | G01F 25/003 73/1.16 |
| 2003/0146758 A1* | 8/2003 | Koike | G01F 1/684 324/453 |
| 2003/0154804 A1 | 8/2003 | Henry et al. | |
| 2003/0233203 A1* | 12/2003 | Grumstrup | G01F 1/24 702/98 |
| 2004/0200259 A1* | 10/2004 | Mattar | G01F 1/74 73/1.34 |
| 2004/0206189 A1 | 10/2004 | Henry et al. | |
| 2005/0092101 A1* | 5/2005 | Bengtson | G01F 1/3209 73/861.22 |
| 2006/0169058 A1* | 8/2006 | Gysling | G01F 1/7082 73/861.355 |
| 2006/0265148 A1* | 11/2006 | Stack | G01F 1/8436 702/45 |
| 2006/0278021 A1* | 12/2006 | Roost | G01F 1/8413 73/861.357 |
| 2006/0287839 A1* | 12/2006 | Dutton | G01F 1/849 702/100 |
| 2007/0245832 A1* | 10/2007 | Schlosser | G01F 1/8413 73/861.01 |
| 2008/0053240 A1 | 3/2008 | Henry et al. | |
| 2008/0092667 A1* | 4/2008 | Shelly | G01F 1/8436 73/861.355 |
| 2008/0184813 A1* | 8/2008 | Patten | G01F 1/8413 73/861.355 |
| 2008/0216555 A1* | 9/2008 | Funck | G01F 1/66 73/1.16 |
| 2008/0281535 A1* | 11/2008 | Rensing | G01F 1/8413 702/56 |
| 2009/0055119 A1* | 2/2009 | Baumoel | G01F 1/667 702/100 |
| 2009/0272173 A1* | 11/2009 | McAnally | G01F 1/8413 73/1.16 |
| 2010/0089174 A1* | 4/2010 | Van Cleve | G01F 1/8413 73/861.357 |
| 2010/0175456 A1* | 7/2010 | Stack | G01F 1/8413 73/1.16 |
| 2010/0206090 A1* | 8/2010 | Stack | G01F 1/8477 73/861.357 |
| 2011/0144938 A1 | 6/2011 | Mcanally | |
| 2012/0055229 A1* | 3/2012 | Pankratz | G01F 1/8477 73/1.34 |
| 2012/0125123 A1* | 5/2012 | Hays | G01F 1/8431 73/861.357 |
| 2012/0125124 A1* | 5/2012 | Hays | G01F 1/8436 73/861.357 |
| 2013/0125612 A1* | 5/2013 | Hays | G01F 25/0007 73/1.16 |
| 2014/0123727 A1* | 5/2014 | Weinstein | G01F 1/8436 73/1.16 |
| 2017/0131128 A1* | 5/2017 | Zimmer | G01F 1/8436 |
| 2017/0153132 A1* | 6/2017 | Aughton | G01F 1/667 |
| 2019/0234784 A1* | 8/2019 | Patten | G01F 1/8431 |
| 2020/0249063 A1* | 8/2020 | Greco | G01F 15/024 |

FOREIGN PATENT DOCUMENTS

| | | | |
|---|---|---|---|
| WO | 9301473 A1 | 1/1993 | |
| WO | 2001071291 A1 | 9/2001 | |
| WO | 2005017469 A1 | 2/2005 | |
| WO | 2005031285 A1 | 4/2005 | |
| WO | WO-2006060767 A2 * | 6/2006 | G01F 1/666 |
| WO | 2008013545 A1 | 1/2008 | |
| WO | 2009051588 A1 | 4/2009 | |
| WO | 2011019344 A2 | 2/2011 | |
| WO | 2011019345 A1 | 2/2011 | |
| WO | 2013002759 A1 | 1/2013 | |
| WO | 2013006171 A1 | 1/2013 | |

* cited by examiner

APPARATUS FOR APPLYING A VARIABLE ZERO ALGORITHM IN A VIBRATING FLOWMETER AND RELATED METHOD

CROSS REFERENCE TO RELATED APPLICATIONS

This application is a national stage application of International Application No. PCT/US2015/049312, filed Sep. 10, 2015, entitled "APPARATUS FOR APPLYING A VARIABLE ZERO ALGORITHM IN A VIBRATING FLOWMETER AND RELATED METHOD", which claims the benefit of priority under 35 U.S.C. § 120 of U.S. Provisional Application No. 62/066,679, filed Oct. 21, 2014, and both applications are hereby incorporated by reference in their entirety.

TECHNICAL FIELD

The present invention relates to flowmeters, and more particularly to a method and apparatus for determining and applying variable zero algorithms to a vibrating flowmeter under variable operating conditions.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor (FCF) can be multiplied by the time delay measured by the pickoffs ($\Delta T$) minus the zero offset ($\Delta T_0$) to generate a mass flow rate. Such mass flow calibrations may be represented by two calibration constants, which are equivalent to the slope (FCF) and intercept (zero offset) of a straight line. An example of a mass flow rate equation utilizing a flow calibration factor (FCF) and a zero offset ($\Delta T_0$) is described by Equation (1):

$$\dot{m} = FCF(\Delta T_{measured} - \Delta T_0) \quad (1)$$

Where:
$\dot{m}$=mass flow rate
FCF=flow calibration factor
$\Delta T_{measured}$=measured time delay
$\Delta T_0$=initial zero offset In most situations, the flowmeter is initially calibrated, typically by the manufacturer, and assumed to provide accurate measurements without subsequent calibrations required. Although an initially determined zero offset can adequately correct the measurements in limited circumstances, the multitude of operating conditions may affect the zero offset. Such operating conditions include pressure, fluid density, sensor mounting conditions, etc. One prior art approach to calibrating a flowmeter involves a user stopping flow to the flowmeter to provide the meter with a zero flow rate reference at process conditions, at which point the user may initiate a zero calibration routine, which defines a zero offset for use by meter electronics. This may be referred to as a "push-button zero." Here, the meter is calibrated at two points: 0% and 100% of full scale, where the 0% value is set by the push-button zero procedure. However, using a push-button zero approach can result in non-linearities on some meters. The push-button zero approach also results in errors as high as 1% at low flow rates, which is unacceptably high.

Since Coriolis meters can have small non-linearities that cause errors at low flow rates, a push-button zero approach may not always be an optimal calibration solution. Careful adjustment of the slope and intercept constants using a "two-rate zero," however, results in calibration data that is usually better than ±0.10%. A two-rate zero calibration simply uses a flow greater than 0%, typically 10%, along with a higher flow rate point, typically 100%, to establish the two constants—slope and intercept. Unfortunately, a two-rate zero calibration method results in a non-zero flow indication at a no-flow condition, which is often outside of the product's zero stability value specification. Therefore, neither calibration method is ideal in all situations.

Therefore, there is a need in the art for an apparatus and method to allow a two-rate zero calibration to be performed while also allowing a standard push-button zeroing to be performed.

The present invention overcomes the above difficulties and other problems and an advance in the art is achieved.

SUMMARY OF THE INVENTION

A method of operating a flowmeter is provided according to an embodiment. The embodiment comprises the steps of:

measuring a fluid flow in the flowmeter; determining at least one fluid characteristic; determining a preferred algorithm of a plurality of algorithms based upon the fluid flow and the at least one fluid characteristic; and applying the preferred algorithm to an operating routine to determine a mass flow rate.

A flowmeter configured to measure a flow rate and a density of a fluid therein is provided according to an embodiment. The embodiment comprises a meter electronics having a processing system and a storage system. A plurality of pickoffs affixed to flowmeter conduits in communication with the meter electronics is also provided. Additionally, a driver is affixed to flowmeter conduits in communication with the meter electronics, wherein the meter electronics is configured to measure a fluid flow of a process fluid in a sensor assembly and determine at least one fluid characteristic of the process fluid. Lastly, the meter electronics is configured to determine a preferred algorithm of a plurality of algorithms based upon the fluid flow and the at least one fluid characteristic, and to apply the preferred algorithm to an operating routine.

Aspects

According to an aspect, a method for operating a flowmeter is provided. The aspect comprises the steps of: measuring a fluid flow in the flowmeter; determining at least one fluid characteristic; determining a preferred algorithm of a plurality of algorithms based upon the fluid flow and the at least one fluid characteristic; and applying the preferred algorithm to an operating routine to determine a mass flow rate.

Preferably, the step of determining at least one fluid characteristic comprises the step of determining a fluid density.

Preferably, the step of determining a fluid density comprises the steps of: measuring a fluid density; determining if the fluid density is below a predetermined threshold; and determining if the fluid density is above a predetermined threshold.

Preferably, the predetermined threshold is 800 kg/m3.

Preferably, the step of determining at least one fluid characteristic comprises the step of determining a fluid temperature.

Preferably, the method comprises the step of determining whether a post-calibration compensation is present.

Preferably, the plurality of algorithms comprises at least a first algorithm and a second algorithm, wherein the first algorithm comprises a push-button zero routine, and the second algorithm comprises a two-rate zero routine.

Preferably, the mass flow rate is determined using an equation comprising:

$$\dot{m}FCF(\Delta T_{measured} - T_0),$$

wherein:
$\dot{m}$ is a mass flow rate;
FCF is flow calibration factor;
$\Delta T_{measured}$ is a measured time delay;
$\Delta T_0$ is an initial zero offset;
wherein the push-button zero routine comprises defining the initial zero offset by stopping flow to the flowmeter to provide a zero flow rate condition, and initiating a zero calibration routine to define the initial zero offset as the flow rate measured during the zero flow rate condition.

Preferably, the mass flow rate is determined using an equation:

$$\dot{m} = FCF(\Delta T_{measured} - \Delta T_0 + \Delta T_0 3),$$

wherein:
$\dot{m}$ is a mass flow rate;
FCF is flow calibration factor;
$\Delta T_{measured}$ is a measured time delay;
$\Delta T_0$ is an initial zero offset;
$\Delta T_0 3$ is a two-rate offset; and
wherein the two-rate zero routine comprises defining the two-rate offset by subtracting a two-rate time delay from the zero offset, wherein the two-rate time delay is a flow value measured during a non-zero flow rate condition.

Preferably, the preferred algorithm comprises the first algorithm when the fluid flow in the flowmeter is less than a low flow cutoff value.

Preferably, the low flow cutoff value is between 40 ns and 1000 ns.

Preferably, the low flow cutoff value comprises a user input dictating a low flow cutoff value.

Preferably, the preferred algorithm comprises the first algorithm when the fluid density in the flowmeter is below a predetermined threshold.

Preferably, the preferred algorithm comprises the first algorithm when a post-calibration compensation is present.

Preferably, the preferred algorithm comprises the second algorithm when the fluid flow in the flowmeter is greater than a low flow cutoff value, the fluid density in the flowmeter is above a predetermined threshold, and no post-calibration compensation is present.

According to an aspect, a flowmeter configured to measure a flow rate and a density of a fluid therein is provided. The aspect comprises: a meter electronics comprising a processing system and a storage system; a plurality of pickoffs affixed to flowmeter conduits in communication with the meter electronics; a driver affixed to flowmeter conduits in communication with the meter electronics, wherein the meter electronics is configured to measure a fluid flow of a process fluid in a sensor assembly and to determine at least one fluid characteristic of the process fluid, and wherein the meter electronics is configured to determine a preferred algorithm of a plurality of algorithms based upon the fluid flow and the at least one fluid characteristic, and to apply the preferred algorithm to an operating routine.

Preferably, the at least one fluid characteristic comprises a fluid phase.

Preferably, the at least one fluid characteristic comprises a fluid density, and the meter electronics is configured to determine that the fluid is a gas if the density is below a predetermined threshold, and is configured to determine that the fluid is a liquid if the density is above a predetermined threshold.

Preferably, the predetermined threshold is 800 kg/m3.

Preferably, the plurality of algorithms comprises at least a first algorithm and a second algorithm, wherein the first algorithm comprises a push-button zero routine, and the second algorithm comprises a two-rate zero routine.

Preferably, the mass flow rate algorithm comprises an equation:

$$\dot{m} = FCF(\Delta T_{measured} - \Delta T_0),$$

wherein:
$\dot{m}$ is a mass flow rate;
FCF is flow calibration factor;
$\Delta T_{measured}$ is a measured time delay;
$\Delta T_0$ is an initial zero offset;
wherein the push-button zero routine comprises an initial zero offset defined as a flow rate measured while the flowmeter experiences a zero flow rate condition.

Preferably, the mass flow rate algorithm comprises an equation:

$$\dot{m} = FCF(\Delta T_{measured} - \Delta T_0 + \Delta T_0 3),$$

wherein:
$\dot{m}$ is a mass flow rate;
FCF is flow calibration factor;
$\Delta T_{measured}$ is a measured time delay;
$\Delta T_0$ is an initial zero offset;
$\Delta T_0 3$ is a two-rate offset;
wherein the two-rate zero routine comprises the two-rate offset defined by subtracting a two-rate time delay from the zero offset, wherein the two-rate time delay is a flow rate value measured during a non-zero flow rate condition.

Preferably, the preferred algorithm comprises the first algorithm when the fluid flow in the flowmeter is less than a low flow cutoff value.

Preferably, the low flow cutoff value is between 40 ns and 1000 ns.

Preferably, the low flow cutoff value comprises a user input dictating a low flow cutoff value.

Preferably, the preferred algorithm comprises the first algorithm when the fluid in the flowmeter is a gas.

Preferably, the preferred algorithm comprises the first algorithm when a post-calibration compensation is present.

Preferably, the preferred algorithm comprises the second algorithm when the fluid flow in the flowmeter is greater than a low flow cutoff value, the fluid in the flowmeter is a liquid, and no post-calibration compensation is present.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention, and will appreciate that the features described below can be combined in various ways to form multiple variations of the invention. As a result, the invention is not limited to the specific examples described below, but only by the claims and their equivalents.

Figure 1:
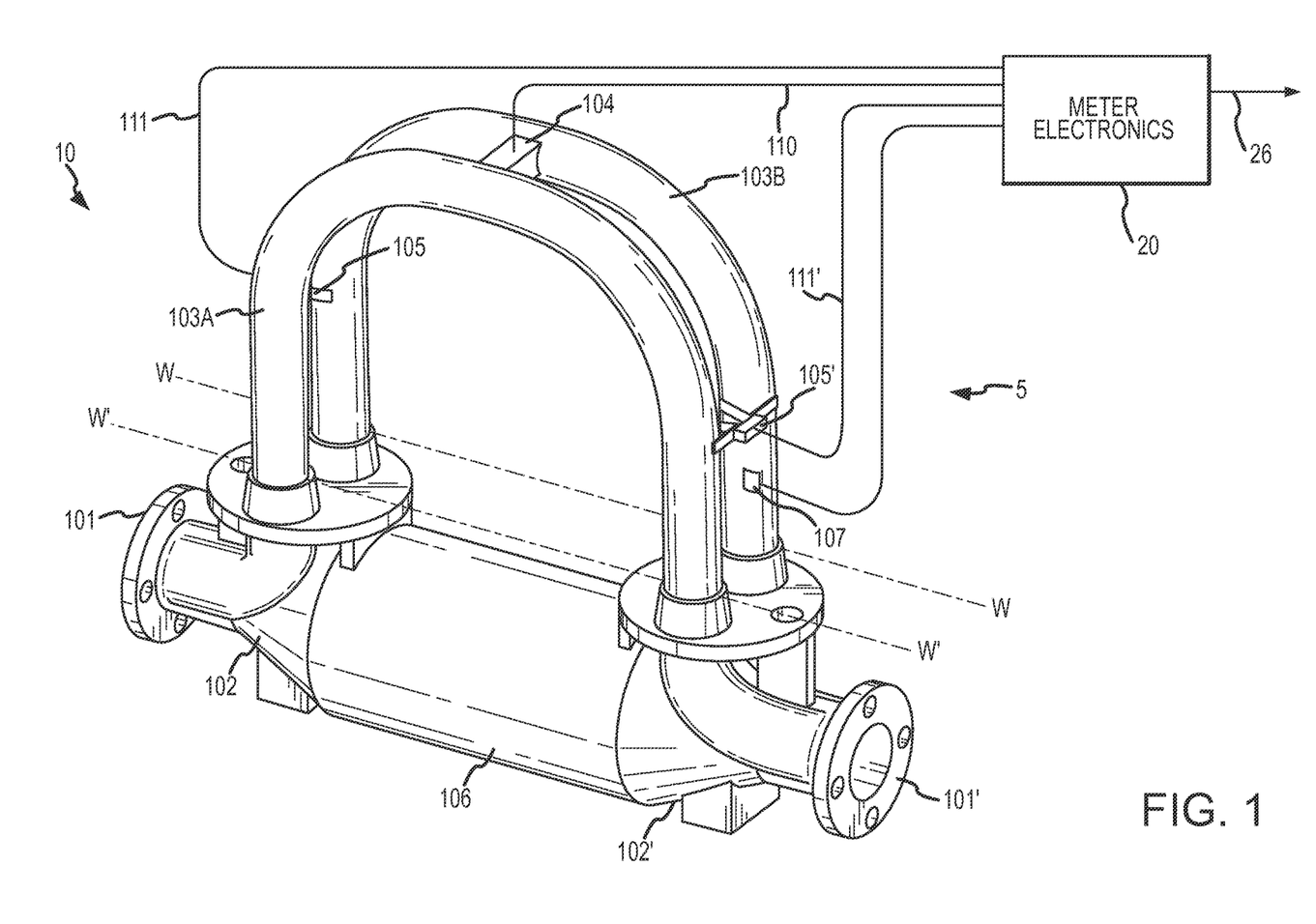
FIG. 1 shows a vibrating sensor assembly according to an embodiment of the invention.

FIG. 1 illustrates an example of a flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate. Those of ordinary skill in the art will appreciate that other drive modes may be used within the scope of the present invention.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the sensor assembly 10 described above comprises a dual flow conduit flowmeter, it is well within the scope of the present invention to implement a single conduit flowmeter. Furthermore, while the flow conduits 103A, 103B are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material.

The techniques by which vibrating sensor assemblies, such as for example, Coriolis flowmeters or densitometers, measure a characteristic of a flowing material are well understood; therefore, a detailed discussion is omitted for brevity of this description.

As discussed briefly above, one challenge associated with sensor assemblies, such as Coriolis flowmeters, is the presence of a zero offset, which is the measured time delay of the pickoffs 105, 105' at zero fluid flow. If the zero offset is not taken into account when calculating the flow rate and various other flow measurements, the flow measurements will typically include an error. As noted, the typical prior art approach to compensate for the zero offset is to measure an initial zero offset ($\Delta t_0$) during an initial calibration process, which usually involves closing valves and providing a zero flow reference condition. Such calibration processes are generally known in the art and a detailed discussion is omitted for brevity of the description. Once an initial zero offset is determined, flow measurements are corrected, during meter operation, by subtracting the initial zero offset from the measured time difference according to Equation (1). It should be appreciated that Equation (1) is merely provided as an example and should in no way limit the scope of the present invention, as other methods and/or equations are contemplated. Although Equation (1) is provided to calculate mass flow rate, it should also be appreciated that various other flow measurements may be affected by the zero offset and therefore, may also be corrected. This approach can provide satisfactory results in situations where the operating conditions are substantially the same as those present during the initial calibration and determination of the zero offset ($\Delta t_0$). In many circumstances, however, the operating conditions during use are substantially different from the operating conditions present during calibration.

It has been traditionally recommended that users of a flowmeter check the zero reading at zero flow and re-zero if necessary. If a user performs this procedure, however, zeroing the meter negates any two-rate zero calibration that may have been employed. In order to utilize a two-rate zero calibration method and allow a user to re-zero as necessary, an embodiment of the invention provides logic to the meter electronics of the mass flowmeter. In prior art devices, mass flow is reported regardless of the operating fluid (gas vs. liquid for instance) or operating range (low flow vs. high flow). In an embodiment, by employing a more sophisticated, decision-based model, accurate meter performance is realized, while at the same time allowing for a standard zeroing of the meter. This provides a meter output that accurately reports no-flow zero rates, while also providing accurate low-flow rates.

Figure 2:
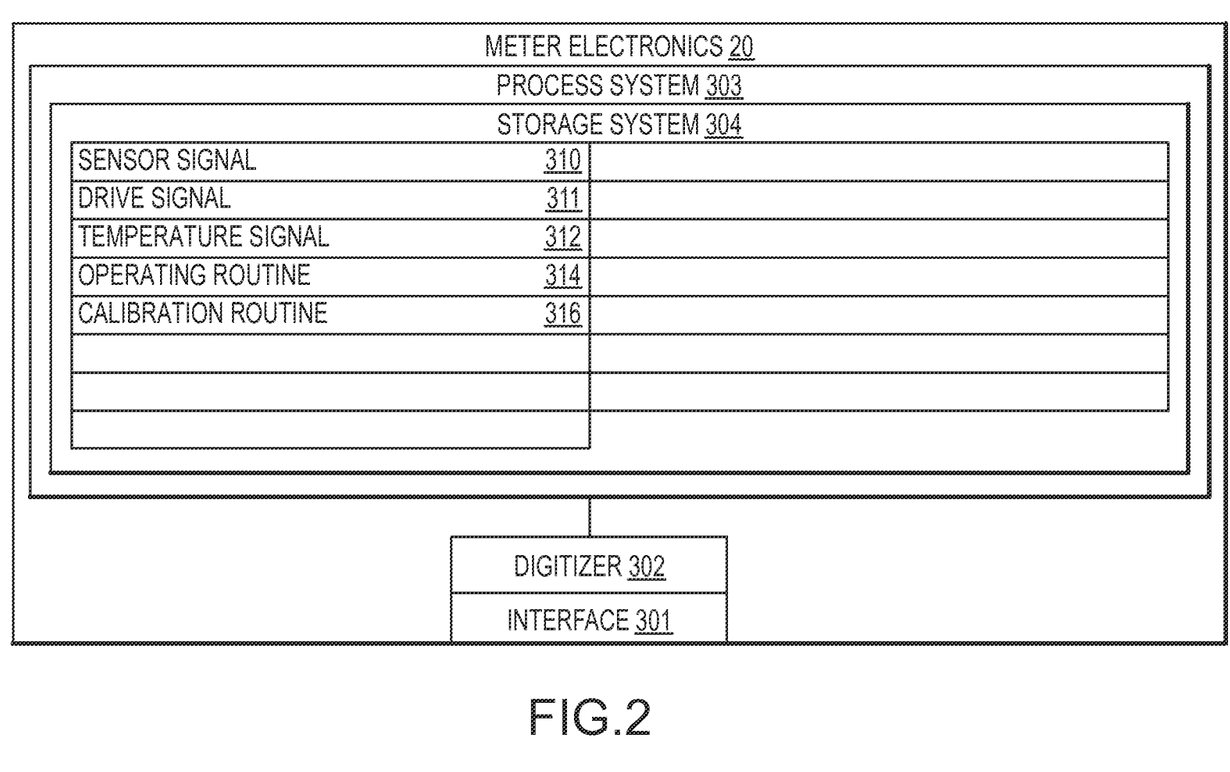
FIG. 2 shows meter electronics according to an embodiment of the invention.

FIG. 2 shows the meter electronics 20 according to an embodiment of the invention. The meter electronics 20 can include an interface 301 and a processing system 303. The processing system 303 may include a storage system 304. The storage system 304 may comprise an internal memory and/or may comprise an external memory. The meter electronics 20 can generate a drive signal 311 and supply the drive signal 311 to the driver 104. In addition, the meter electronics 20 can receive sensor signals 310 from the pickoffs 105, 105', such as pickoff/velocity sensor signals, strain signals, optical signals, or any other signals known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103A, 103B. In some embodiments, the meter electronics 20 may receive a temperature signal 312 from one or more resistive temperature detectors (RTD) sensors or other temperature sensors 107, for example.

The interface 301 can receive the sensor signals 310 from the driver 104 or pickoffs 105, 105', via leads 110, 111, 111'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a general operating routine 314 and calibration routine 316, and thereby process inputs in order to produce one or more flow measurements that are accurate under a wide variety of conditions.

As an example of an overview of an embodiment of a calibration routine 316, the system may be calibrated with a factory zero value at no-flow conditions. A user, at any time, may additionally, and optionally, perform a push-button zero. These various zero values are stored in the storage system 304. As part of the operating routine 314, the meter electronics 20 may generate and store values associated with process functions, such as the flow rate of process material, the density of process material, as well as any user-specified settings, such as any post-calibration compensation, for example, without limitation.

Meter electronics 20 inputs/measurements, saved values/constants, user settings, saved tables, etc. may be employed by the calibration routine 316. The calibration routine 316 monitors flowmeter 5 conditions and applies the calibration algorithm deemed most appropriate for the conditions. Conditions may include user-input conditions, for example without limitation. Conditions may also include any combination of temperature, fluid density, flow rate, meter specifications, viscosity, Reynold's number, post calibration compensation, etc. There may be any number of algorithms applied as part of the calibration routine 316. In one embodiment, a first algorithm comprises a push-button zero, and a second algorithm comprises a two-rate zero calibration. These are merely examples of algorithms, and other algorithms are contemplated. In this example, two algorithms are contemplated, but lookup tables of different algorithms are contemplated, and the most appropriate algorithm based upon conditions may be applied as needed. Additionally, besides differing algorithms, different constants, such as a flow calibration factor (FCF), for example without limitation, may be applied to the chosen algorithm based on operating conditions or user preference.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as storage system 304.

The processing system 303 processes the sensor signal 310 in order to generate a drive signal, among other things. The drive signal is supplied to the driver 104 via lead 110 in order to vibrate the associated flow tube(s), such as the flow tubes 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

Figure 3:
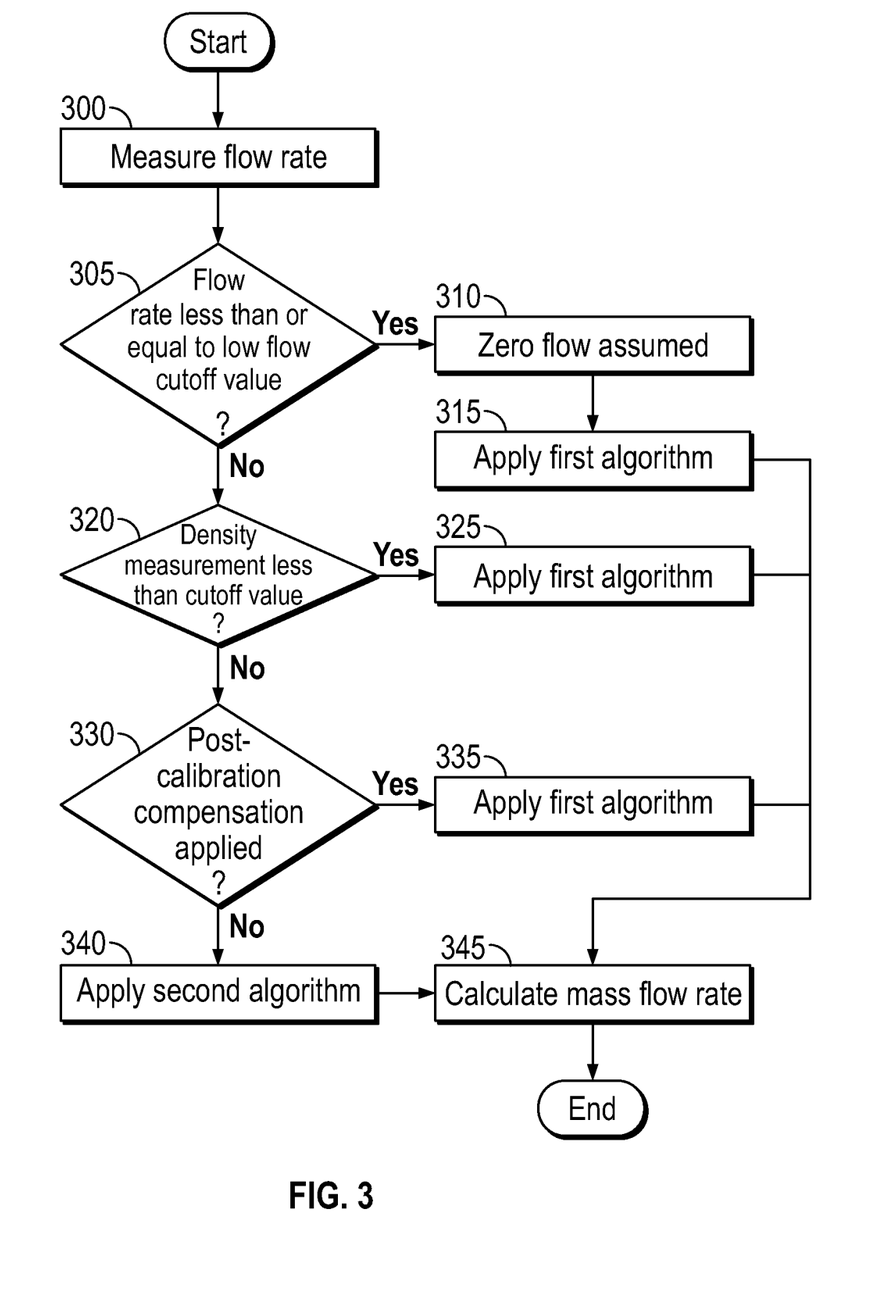
FIG. 3 is a flow chart describing a portion of a calibration routine according to an embodiment of the invention.

FIG. 3 is a flow chart that illustrates an embodiment of a portion of an operating routine 314 according to an embodiment. This portion of the operating routine 314 aids in determining which zeroing routine is employed in determining mass flow. In step 300 the flow rate of the fluid in the flow tubes 103A, 103B is measured. If the flow rate is below a low flow cutoff value, which is determined in step 305, a zero flow condition is assumed in step 310. Should this be the case, a first algorithm is applied in step 315. A flow rate less than or equal to this low flow rate cutoff value is treated by meter electronics 20 as a zero flow condition.

For example, in an embodiment, if the low flow rate cutoff is defined as 1 μs, and the flow rate is less than or equal to 1 μs, a zero flow condition is assumed. In yet another embodiment, the low flow cutoff value may be defined as a percentage of maximal flow. In yet another embodiment, a user may stop flow to the flowmeter 5 to provide the flowmeter a zero flow condition reference, at which point the user may initiate a zero calibration routine, which is simply a "push-button zero," as previously described.

If a fluid is determined to be flowing through the flowmeter 5, then step 305 proceeds to step 320, wherein it is determined whether the fluid is above or below the density cutoff value. If the fluid is determined to be below the density cutoff, the first algorithm is applied in step 325. If, on the other hand, the fluid is determined to be above the density cutoff, then step 320 proceeds to step 330. In an embodiment, the density cutoff value is 800 kg/m³. This is only an example, and the cutoff value may be greater or less than 800 kg/m³. In an embodiment, a user may input a fluid density. In another embodiment, a temperature of the fluid is measured, and the predetermined density cutoff is adjusted higher or lower based upon the measured temperature. In yet another embodiment, a pressure of the fluid is measured, and the predetermined density cutoff is adjusted higher or lower based upon the measured pressure. A lookup table with the meter electronics 20 may store temperature, pressure, and density values, such that an appropriate density cutoff threshold is applied to the calibration routine 316 based on process conditions.

In step 330, it is optionally determined whether a post-calibration compensation is applied to meter calculations. For example, without limitation, fluids with higher densities may need additional compensation factors applied during the operating routine 314. In another embodiment, a post-calibration compensation comprises an alternate FCF. Since not all calibration compensation algorithms will yield accurate results when paired with particular post-calibration compensations, it is advantageous to take this into account. For example, a meter experiencing flow of a process fluid having a high density may yield more accurate flow rates if a V/ρ compensation algorithm is applied. Once an appropriate algorithm is applied to the operating routine 314, as in steps 315, 325, 335, or 340, the mass flow rate is calculated in step 345.

Figure 4:
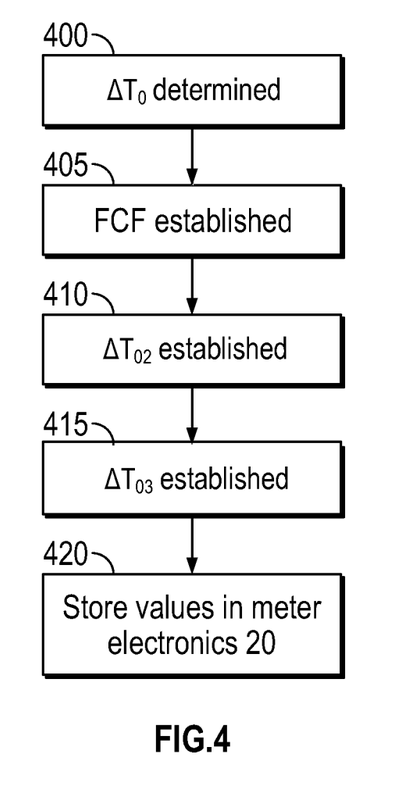
FIG. 4 is a flow chart describing an initial flowmeter setup according to an embodiment of the invention.

FIG. 4 illustrates a flow chart that describes an embodiment of an initial flowmeter 5 setup. According to an embodiment of the invention, the zero offset may comprise an initially factory-determined zero offset. According to another embodiment of the invention, the zero offset may comprise a subsequently determined zero offset. The subsequently determined zero offset may be different than the initially determined zero offset. This may be the case especially in situations where the operating conditions are different from the operating conditions when the initial zero offset was determined, for example. Subsequently determined zero offsets, such as a push-button zero process, may be recorded by users as the need arises due to changing operating conditions.

In step 400 an initial zero offset ($\Delta T_0$) is determined, which may be conducted as part of the initial factory setup. For the particular flowmeter 5 being initially set up, this entails placing the flowmeter 5 under zero flow conditions, and reading the measured flow. The difference between zero and the measured flow is stored in the storage system 304 as the initial zero offset ($\Delta T_0$). Once the initial zero offset ($\Delta T_0$) is determined in step 400, the flow calibration factor (FCF) is established, which, as noted earlier, is the slope of the line that dictates the relationship between the measured time delay ($\Delta t_{measured}$) and the mass flow rate ($\dot{m}$). The FCF is also stored in the storage system 304. In step 410, a two-rate time delay ($\Delta T_0 2$) is established. Similar to establishing the initial zero offset ($\Delta T_0$ with a push-button zero, the two-rate time delay ($\Delta T_0 2$) is established, but at a non-zero flow rate. The two-rate time delay ($\Delta T_0 2$) may be determined at any flow rate greater than 0% of maximal flow. In an embodiment, the two-rate time delay ($\Delta T_0 2$) is determined at 10% of maximal flow, for example without limitation. 10% is merely an example, and the two-rate time delay ($\Delta T_0 2$) may alternatively be determined at a flow rate that is less than or greater than 10% of maximal flow. In step 415 the two-rate offset ($\Delta T_0 3$) is determined and may be stored in the storage system 304. In an embodiment, the two-rate offset ($\Delta T_0 3$) is calculated by Equation (2):

$$\Delta T_0 3 = \Delta T_0 - \Delta T_0 2 \qquad (2)$$

Where:
$\Delta T_0 2$ = two-rate time delay
$\Delta T_0 3$ = two-rate offset
$\Delta T_0$ = initial zero offset Equation (2) is provided as an example only, as other equations are contemplated for calculating the two-rate offset ($\Delta T_0 3$).

The initial zero offset ($\Delta T_0$, flow calibration factor (FCF), two-rate time delay ($\Delta T_0 2$), and two-rate offset ($\Delta T_0 3$) are stored in meter electronics 20 in step 420. In an embodiment, the meter electronics 20 stores these values in the storage system 304.

The values initially derived as part of the initial flowmeter 5 setup are employed in algorithms for determining mass flow rate. In an embodiment, a first algorithm comprises a push-button zero routine. Mass flow rate calculations may employ the initial zero offset ($\Delta T_0$ derived by a push-button zero routine or factory calibration for example, and may be calculated according to Equation (1). In an embodiment a second algorithm comprises a two-rate zero routine, and mass flow rate may be calculated according to Equation (3):

$$\dot{m} = FCF(\Delta T_{measured} - \Delta T_0 + \Delta T_0 3) \quad (3)$$

Where:
$\dot{m}$ = mass flow rate
FCF = flow calibration factor
$\Delta T_{measured}$ = measured time delay
$\Delta T_0$ = initial zero offset
$\Delta T_0 3$ = two-rate offset In an embodiment, the meter electronics 20 optimizes calibration based upon the conditions experienced by the flowmeter 5. For example, if a zero-flow condition is detected, then the first algorithm is applied to the operating routine 314. This provides optimal zero-flow accuracy, and zero-stability is kept within operating specifications of the flowmeter 5. It should be noted that if a user re-calibrates the flowmeter 5 under zero-flow conditions, this push-button zero calibration value simply replaces the initial zero offset ($\Delta T_0$) derived in step 400 of FIG. 4. It should also be appreciated that in an embodiment, all calibration data are recorded, so that user zero calibration does not permanently overwrite past zero calibrations. This allows a user to revert to previously saved zero calibrations.

If there is a non-zero fluid flow condition, the density of the fluid is determined in order to ascertain whether the process fluid is below the density cutoff. As gasses typically result in low $\Delta T_{measured}$ values, a more accurate mass flow rate is calculated using the first algorithm, as applied to the operating routine 314. Conversely, if there is a non-zero fluid flow condition and the density of the fluid indicates that the process fluid is above the density cutoff, the second algorithm may be applied to the operating routine 314. In an embodiment, this only holds true if no incompatible post-calibration compensation is applied, as shown in step 330 of FIG. 3. It should be noted that if post-calibration compensation is applied, then the first algorithm may be applied so as to maintain accuracy. In a related embodiment, if post-calibration compensation is applied, then a wholly different algorithm may be applied that is not the first or second algorithm.

It should also be noted that based on the presence or absence of a zero-flow condition, the presence of a high or low density fluid, and the presence or absence of post-calibration compensation or any other flowmeter condition or setting, that an alternate FCF may be substituted for the FCF established in step 405 of FIG. 4, as described above.

The present invention as described above provides various methods and apparatuses to determine and apply variable zero algorithms to a vibrating flowmeter, such as a Coriolis flowmeter, under variable operating conditions. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

We claim:

1. A method for operating a flowmeter comprising:
measuring a fluid flow in the flowmeter;
determining if the fluid flow is less than or equal to a low flow cutoff value;
determining at least one fluid characteristic, wherein the step of determining at least one fluid characteristic comprises the step of measuring a fluid density with the flowmeter;
determining if the density is above or below a predetermined threshold;
choosing, by a meter electronics of the flowmeter during flowmeter operation, a preferred algorithm from a plurality of zero calibration algorithms stored in the meter electronics, the determining of the preferred algorithm being based upon the fluid flow and the fluid density; and
applying the preferred zero calibration algorithm to an operating routine to determine a mass flow rate.

2. The method of claim 1, wherein the predetermined threshold is 800 kg/m$^3$.

3. The method of claim 1, wherein the step of determining at least one fluid characteristic comprises the step of determining a fluid temperature.

4. The method of claim 1, comprising the step of determining whether a post-calibration compensation is present.

5. The method of claim 1, wherein the plurality of zero calibration algorithms comprises at least a first algorithm and a second algorithm, wherein:
the first algorithm comprises a push-button zero routine; and
the second algorithm comprises a two-rate routine.

6. The method of claim 5, wherein the mass flow rate is determined using an equation comprising: $\dot{m} = FCF (\Delta T_{measured} - \Delta T_0)$, wherein:
$\dot{m}$ is a mass flow rate;
FCF is flow calibration factor;
$\Delta T_{measured}$ is a measured time delay;
$\Delta_0$ is an initial zero offset;
wherein:
the push-button zero routine comprises defining the initial zero offset ($\Delta T_0$) by:

stopping flow to the flowmeter to provide a zero flow rate condition; and initiating a zero calibration routine to define the initial zero offset ($\Delta T_0$) as the flow rate measured during the zero flow rate condition.

7. The method of claim 5, wherein the mass flow rate is determined using an equation comprising: $\dot{m}=\text{FCF}(\Delta T_{measured}-\Delta T_0+\Delta T_03)$ wherein:

$\dot{m}$ is a mass flow rate;
FCF is flow calibration factor;
$\Delta T_{measured}$ is a measured time delay;
$\Delta T_0$ is an initial zero offset;
$\Delta T_03$ is a two-rate offset; and wherein:
the two-rate zero routine comprises defining the two-rate offset ($\Delta T_03$) by:
subtracting a two-rate time delay ($\Delta T_02$) from the zero offset ($\Delta T_0$), wherein the two-rate time delay ($\Delta T_02$) is a flow value measured during a non-zero flow rate condition.

8. The method of claim 5, wherein the preferred algorithm comprises the first algorithm when the fluid flow in the flowmeter is less than a low flow cutoff value.

9. The method of claim 8, wherein the low flow cutoff value is between 40 ns and 1000 ns.

10. The method of claim 8, wherein the low flow cutoff value comprises a user input dictating a low flow cutoff value.

11. The method of claim 5, wherein the preferred algorithm comprises the first algorithm when the fluid in the flowmeter is below a predetermined threshold.

12. The method of claim 5, wherein the preferred algorithm comprises the first algorithm when a post-calibration compensation is present.

13. The method of claim 5, wherein the preferred algorithm comprises the second algorithm when the fluid flow in the flowmeter is greater than a low flow cutoff value, the fluid in the flowmeter is above a predetermined threshold, and no post-calibration compensation is present.

14. A flowmeter configured to measure a flow rate and a density of a fluid therein, comprising:

a meter electronics comprising a processing system and a storage system;
a plurality of pickoffs affixed to flowmeter conduits in communication with the meter electronics;
a driver affixed to flowmeter conduits in communication with the meter electronics;
wherein the meter electronics is configured to measure a fluid flow of a process fluid in a sensor assembly and to determine at least one fluid characteristic of the process fluid, wherein the at least one fluid characteristic comprises a fluid density;
wherein the meter electronics is configured to determine that the fluid is a gas if the density is below a predetermined threshold, and to determine that the fluid is a liquid if the density is above a predetermined threshold; and
wherein the meter electronics is configured to choose a preferred algorithm from a plurality of zero calibration algorithms stored in the meter electronics, the determining of the preferred algorithm being based upon the fluid flow and the fluid density, and to apply the preferred algorithm to an operating routine.

15. The flowmeter of claim 14 wherein the at least one fluid characteristic comprises a fluid phase.

16. The flowmeter of claim 14, wherein the predetermined threshold is 800 kg/m$^3$.

17. The flowmeter of claim 14, wherein the plurality of zero calibration algorithms comprises at least a first algorithm and a second algorithm, wherein:

the first algorithm comprises a push-button zero routine; and
the second algorithm comprises a two-rate zero routine.

18. The flowmeter of claim 17, wherein the mass flow rate algorithm comprises an equation: $\dot{m}=\text{FCF}(\Delta T_{measured}-\Delta T_0)$, wherein:

$\dot{m}$ is a mass flow rate;
FCF is flow calibration factor;
$\Delta T_{measured}$ is a measured time delay;
$\Delta T_0$ is an initial zero offset;
wherein:
the push-button zero routine comprises an initial zero offset ($\Delta T_0$) defined as a flow rate measured while a the flowmeter experiences a zero flow rate condition.

19. The flowmeter of claim 17, wherein the mass flow rate algorithm comprises an equation: $\dot{m}=\text{FCF}(\Delta T_{measured}-\Delta T_0+\Delta T_03)$ wherein:

$\dot{m}$ is a mass flow rate;
FCF is flow calibration factor;
$\Delta T_{measured}$ is a measured time delay;
$\Delta T_0$ is an initial zero offset;
$\Delta T_03$ is a two-rate offset;
wherein:
the two-rate zero routine comprises the two-rate offset ($\Delta T_03$) defined by subtracting a two-rate time delay ($\Delta T_02$) from the zero offset ($\Delta T_0$), wherein the two-rate time delay ($\Delta T_02$) is a flow rate value measured during a non-zero flow rate condition.

20. The flowmeter of claim 17, wherein the preferred algorithm comprises the first algorithm when the fluid flow in the flowmeter is less than a low flow cutoff value.

21. The flowmeter of claim 20, wherein the low flow cutoff value is between 40 ns and 1000 ns.

22. The flowmeter of claim 20, wherein the low flow cutoff value comprises a user input dictating a low flow cutoff value.

23. The flowmeter of claim 17, wherein the preferred algorithm comprises the first algorithm when the fluid in the flowmeter is a gas.

24. The flowmeter of claim 17, wherein the preferred algorithm comprises the first algorithm when a post-calibration compensation is present.

25. The flowmeter of claim 17, wherein the preferred algorithm comprises the second algorithm when the fluid flow in the flowmeter is greater than a low flow cutoff value, and the fluid in the flowmeter is a liquid, and no post-calibration compensation is present.

* * * * *

UNITED STATES PATENT AND TRADEMARK OFFICE
CERTIFICATE OF CORRECTION

PATENT NO. : 11,226,221 B2
APPLICATION NO. : 15/513500
DATED : January 18, 2022
INVENTOR(S) : Andrew Timothy Patten et al.

It is certified that error appears in the above-identified patent and that said Letters Patent is hereby corrected as shown below:

In the Specification

Column 3, Line 53, the equation should appear as follows:

$$\dot{m} = FCF(\Delta T_{measured} - \Delta T_0)$$

Column 11, Line 17, replace "zero offset ($\Delta T_0$ derived by" with --zero offset ($\Delta T_0$) derived by--

Signed and Sealed this
Twenty-sixth Day of March, 2024

Katherine Kelly Vidal
*Director of the United States Patent and Trademark Office*